H. L. BERGER.
Rotary Steam-Engine.
No. 215,314. Patented May 13, 1879.
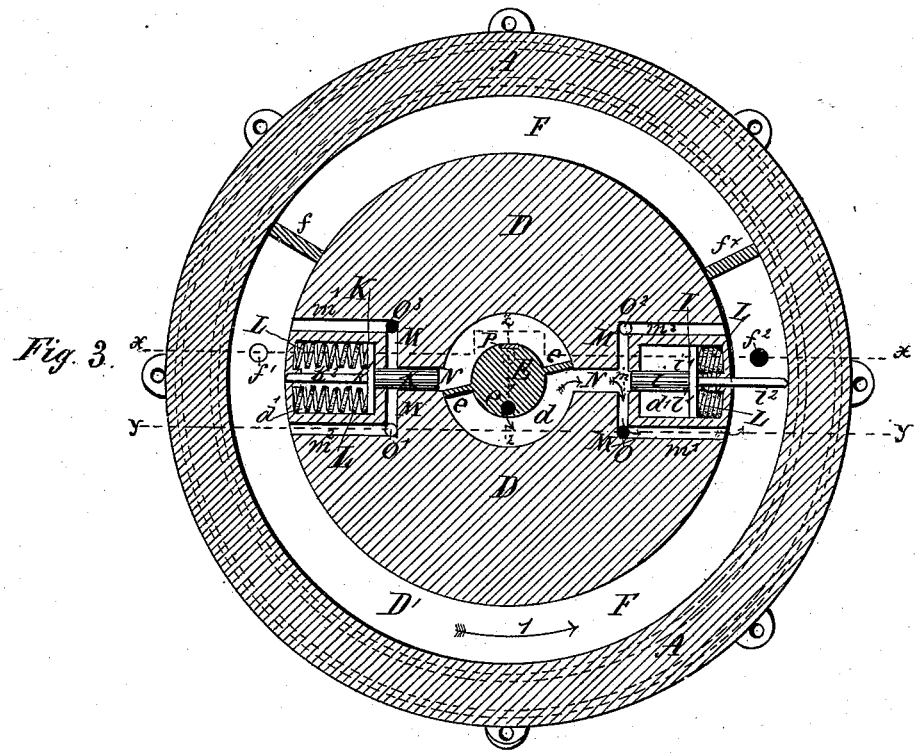
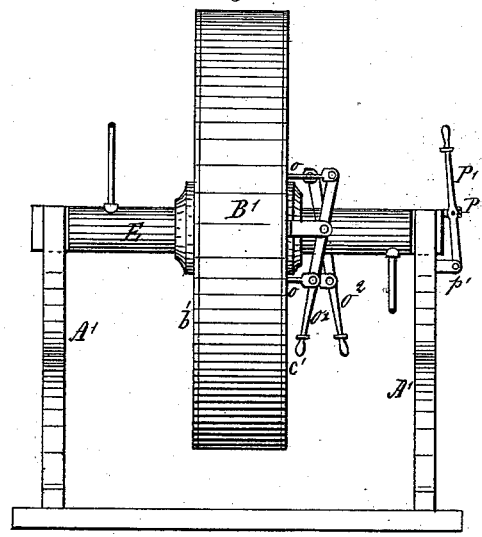
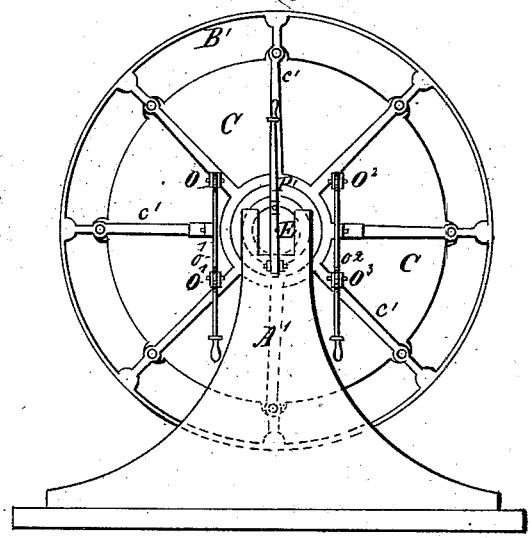

2 Sheets—Sheet 2.
H. L. BERGER.
Rotary Steam-Engine.
No. 215,314. Patented May 13, 1879.
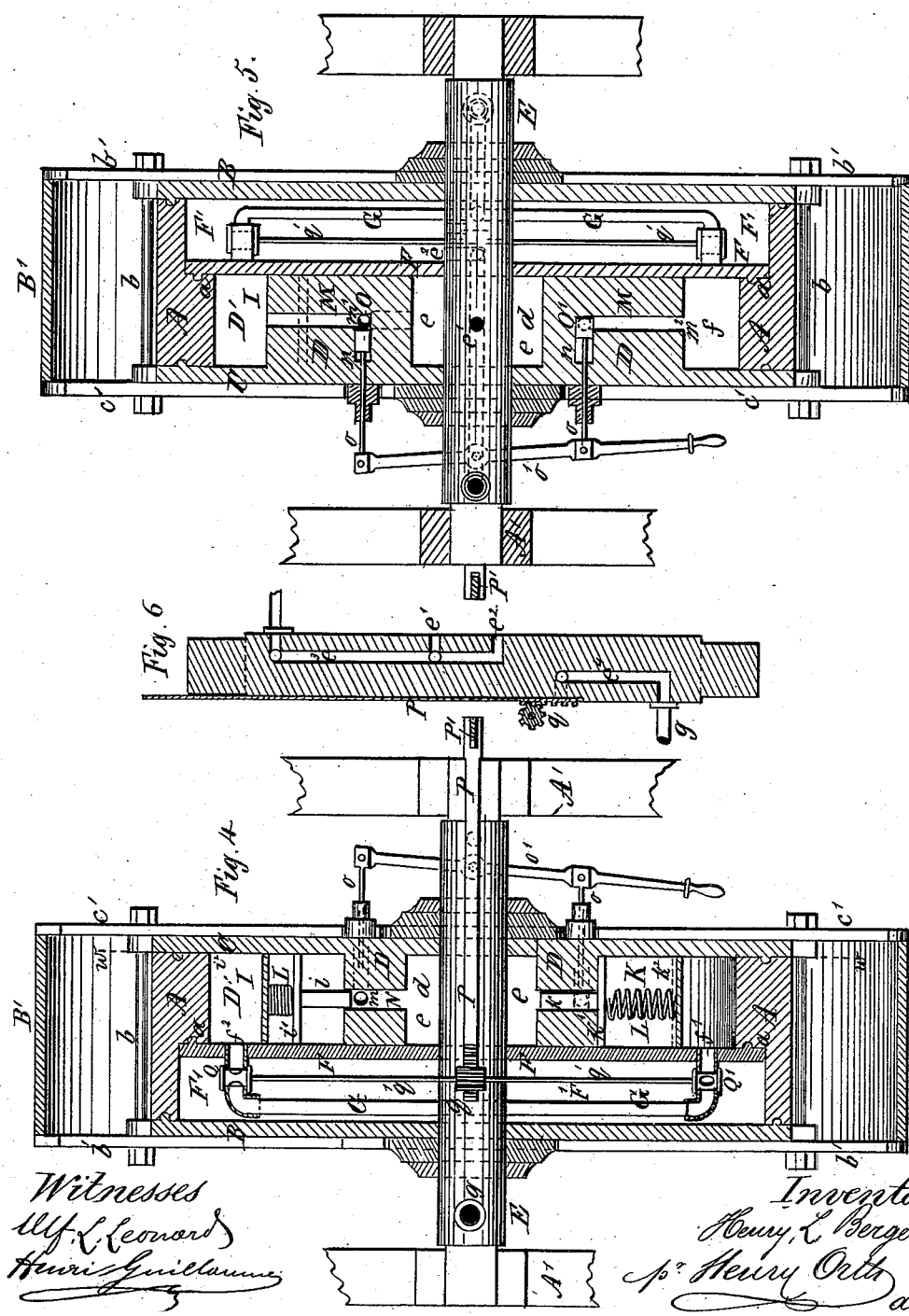

UNITED STATES PATENT OFFICE.

HENRY L. BERGER, OF MOSCOW, MISSISSIPPI, ASSIGNOR OF ONE-HALF HIS RIGHT TO PHILIP RYE, OF SAME PLACE.

IMPROVEMENT IN ROTARY STEAM-ENGINES.

Specification forming part of Letters Patent No. 215,314, dated May 13, 1879; application filed October 9, 1878.

*To all whom it may concern:*

Be it known that I, HENRY L. BERGER, of Moscow, Kemper county, Mississippi, have invented new and useful Improvements in Rotary Steam-Engines, of which the following is a specification.

The object of this invention is to simplify the construction, and hence reduce the cost, of steam-motors of this class, so as to better adapt them to the various wants of the industries, and more especially to the wants of that class of manufacturers requiring motors of limited power.

My improved motor is composed of two distinct parts or systems, to wit: a stationary system composed of a shaft and certain mechanism connected therewith, and a rotating system composed of the cylinder and its respective heads and certain mechanism connected with the latter.

The rotating system is adapted to be belted or geared directly with the driven pulley or gear-wheel, and for this purpose the cylinder-heads may be provided with radial arms or spokes carrying a driving or belt pulley or a toothed ring, all as hereinafter more fully described, and illustrated by the accompanying drawings, in which—

Figures 1 and 2 are front and side elevations, respectively. Fig. 3 is a section on line $w\,w$ of Fig. 4. Figs. 4 and 5 are sections on lines $x\,x\,y\,y$, respectively, of Fig. 3, of a rotary steam-engine constructed according to my invention; and Fig. 6 is a longitudinal section of the shaft on line $z\,z$ of Fig. 3.

A represents the main cylinder provided with an offset, $a$. B and C are the heads, united upon the cylinder A by means of bolts $b$ and tongue-and-groove joints, as shown in Figs. 4 and 5. Each head B C is provided with radial arms $b'\,c'$, which carry the outer cylinder or belt-ring, B', some distance from the main cylinder A, to prevent its becoming heated. Instead of a belt cylinder or ring, B', a toothed ring may be employed, if desired, so as to gear the motor with the driven gear-wheel instead of the driven pulley.

The head C carries a piston-disk, D, provided with an annular central chamber, $d$, and piston-chambers $d'$. The diameter of the disk D is such as to leave, when in proper position, an annular chamber, D', between said disk and the cylinder A, as plainly shown in Fig. 3.

The parts just described constitute the movable system of the motor, the stationary system of which is composed of the shaft E, rigidly secured in its bearings by having its ends squared, as shown, or in any other desired manner.

The shaft E carries a disk, F, resting upon the offset $a$ of the cylinder A, with which it is connected by tongue and groove in such a manner as not to interfere with the rotation of said cylinder A, the arrangement of disk F and cylinder A being such as to form a steam-chamber between the former and the head B, as shown by Figs. 4 and 5.

Upon shaft E are formed partitions $e$, which divide the chamber $d$ around said shaft into two equal parts. The disk F carries abutments $f\,f^{x}$, which divide chamber D' into two parts. Steam is admitted through the shaft E by the induction-passage $e^3$, thence into central chamber, $d$, by port $e^1$. A second port, $e^2$, admits steam into chamber F' between the disk F and head B, and serves as a steam-packing to maintain the movable system and the stationary disk in proper working relation. The steam is exhausted through one of the ports $f^1\,f^2$ in disk F, passing thence through pipe G, located in chamber F', into shaft E, and through passage $e^4$ in said shaft into and out of exhaust-pipe $g$.

I and K represent two pistons, located within the chambers $d'$ of the piston-disk D, diametrically opposite each other. Each piston is composed of a rod, $i\,k$, a head, $i^1\,k^1$, and a wing, $i^2\,k^2$, respectively. These pistons, when not acted upon by the steam, are kept retracted within their chambers by the springs L, the arrangement being plainly shown in Figs. 3 and 4.

Upon opposite sides of each piston-chamber are formed the rectangular steam-passages M, the branches $m^1\,m^2$ of which communicate with the annular chamber D', and the branches $m$ with the passages N, within which the piston-rods $i\,k$ move, which latter passages communicate with the central chamber, $d$. These rectangular passages M are intersected at the junction of their respective branches by piston-valves O O$^1$ O$^2$ O$^3$, moving within piston-valve chambers $n$, formed in the piston-disk D. The rods $o$ of these valves pass out through the head C, which is provided with suitable stuffing-boxes for said rods, and have their ends pivoted to hand-levers $o^1$ $o^2$, these levers being pivoted upon suitable standards secured to the head C, the arrangement being such that each lever will actuate the piston-valves to alternately open and close the branches of the steam-passages M diametrically opposite each other—that is to say, the lever $o^1$ will actuate the valves O O$^1$ of the branches $m^1$ $m^2$ of steam-passages M on one side of the pistons I K, respectively, and the lever $o^2$ will actuate the valves O$^2$ O$^3$ of the branches $m^1$ $m^2$ on the opposite side of said pistons.

P is a rack-bar, recessed and sliding in the shaft E. Its outer end is pivoted to a hand-lever, P', which, in its turn, is pivoted in a suitable bearing, $p'$, upon the standard A' of the supporting-frame. The bar P meshes with a pinion, $q$, mounted upon the valve-rod $q^1$, carrying the valves Q Q', located in suitable casings upon the exhaust-pipe G, as shown by Figs. 4 and 5. This mechanism is employed to reverse the exhaust of the steam, as will be readily seen, and, in conjunction with the mechanism to reverse the induction of the steam, the direction of motion of the motor is reversed, as presently explained.

Referring more particularly to Fig. 3, the operation of the motor is as follows: It will be seen that steam is passing in the direction of the small arrows from port $e^1$ in shaft E into chamber $d$, thence into passage N, and through branch $m^1$ of the passage M into chamber D' in front of the wing $i^2$ of piston I, the branch $m^2$ of the rectangular passage M on the opposite side of the piston I being closed by piston-valve O$^2$, while the piston-wing $k^2$ of piston K is retracted by the spring L, the steam in chamber $d$ being cut off from said piston by the partitions $e$. The branch $m^1$ of passage M in rear of piston K is open, and the branch $m^2$ on the opposite side or in front of said piston is closed, while the exhaust-steam port $f^1$ is closed, and that $f^2$ is open.

The relative position of parts, as just described, will cause the steam to act upon piston-wing $i^2$, and cause the movable system to rotate in the direction of arrow 1, or from left to right. The wing $i^2$ of piston I is, however, about to pass the open exhaust-port $f^2$, and as soon as passed the steam in chamber D' will be exhausted, the springs L at the same time retracting the piston I within its chamber. The piston-disk D will then have rotated sufficiently to bring the piston-rod $k$ past the partition $e$, when the steam in chamber $d$, acting upon the piston-rod $k$, will force the wing $k^2$ out in contact with the inner periphery of the cylinder A. The rod $k$ of said piston clearing ports $m$ of the rectangular passages M will admit steam into chamber D', behind the piston-wing $k^2$, through branch $m^1$, the steam being cut off from branch $m^2$ of the passage M on the opposite side or in front of the piston by valve O$^1$, as above stated. The steam now acting upon piston-wing $k^2$ will drive the movable system from right to left until said wing has passed the exhaust-port $f^2$, when piston I will again be in position to be acted upon by the steam, and so on continuously.

If the direction of motion is now to be reversed, the steam is cut off and the rack-bar P actuated through lever P' to close the valve Q' of exhaust-port $f^2$ and open valve Q of exhaust-port $f$. The lever $o^1$ is next raised to close valve O and open valve O$^1$ of the branches $m^1$ $m^2$, respectively, of the steam-passages M in front of pistons I K, Fig. 3, and the lever $o^2$ is depressed to close valve O$^2$ and open valve O$^3$ of the branches $m^2$ $m^1$, respectively, of the steam-passages M in rear of pistons I K. Now, supposing the pistons to be in the same position as shown by Fig. 3, the steam from chamber $d$ will now pass through N $m^2$ in rear of piston-wing $i^2$, said wing having first been forced out by the readmission of steam to start the motor and drive the movable system around in a direction contrary to that indicated by the arrow 1, or from right to left, until the wing $i^2$ has passed port $f^1$, when the steam will be exhausted, the piston I retracted within its chamber, and the piston K will be in position to be actuated by the steam in chamber $d$, as will be readily understood.

Having now described my invention, what I claim, and desire to secure by Letters Patent, is—

1. In a rotary steam-engine, a rotating system composed of the cylinder A and its heads B C, the head C carrying the piston-disk D, in combination with a stationary system composed of the shaft E, carrying partitions $e$, and disk F, having abutments $f f^×$, substantially as described, for the purpose specified.

2. In a rotary steam-engine, the combination, with the cylinder and its heads, of a piston-disk provided with pistons adapted to be actuated by the steam admitted to said disk, to rotate the latter, together with said cylininder and its respective heads, around a stationary shaft, substantially as described.

3. In rotary steam-engines, the combination, with the disk D, provided with a central steam-chamber, $d$, piston-chambers $d'$, and rectangular steam-passages M on opposite sides of each piston-chamber, of the pistons I K, all arranged, constructed, and operating as described.

4. In rotary steam-engines, the combination, with the pistons I K, of the springs L, arranged to retract said pistons and keep them retracted within their respective chambers when not actuated by the steam, substantially as and for the purpose specified.

5. In a rotary steam-engine, a stationary disk, F, and stationary shaft E, in combination with a rotating cylinder, A, and its head B, arranged to form a steam-chamber, F', substantially as and for the purpose specified.

6. In a rotary steam-engine, the combination, with the chamber F' and disk F, provided with exhaust-ports $f^1$ $f^2$, of the exhaust-pipe G and shaft E, substantially as described, for the purpose specified.

7. In a rotary steam-engine in which the outer cylinder rotates around a stationary shaft, a reversing mechanism for the exhaust-steam ports, adapted to be operated through the medium of said shaft, in combination with a mechanism for reversing the induction of the steam, adapted to be operated independently of the former mechanism, substantially as described, for the purpose set forth.

8. In a rotary steam-engine, the combination, with a reversing mechanism for the induction of steam, of an eduction mechanism comprising the rack-bar P, pinion $q$, valve-rod $q'$, and valves Q Q', exhaust-pipe G, and shaft E, all arranged and operating as set forth.

9. In a rotary steam-engine, the combination of a reversing mechanism for the eduction of steam, with an induction mechanism comprising the piston-valves O $O^1$ $O^2$ $O^3$ and the piston-disk D, having rectangular steam-passages M on opposite sides of each piston I K, all arranged, constructed, and operating substantially as and for the purpose specified.

10. In a rotary steam-engine, the reversing mechanism for the induction of the steam, arranged to be operated through and forming part of the rotating system, in combination with a mechanism for reversing the eduction or exhaust of the steam, arranged to be operated through and forming part of the stationary system, substantially as hereinbefore described, for the purpose specified.

In witness that I claim the foregoing I have hereunto set my hand this 17th day of September, 1878.

HENRY L. BERGER.

Witnesses:
WILLIAM S. RYE,
W. M. DENEY.